US011549632B2

(12) United States Patent
Spering

(10) Patent No.: US 11,549,632 B2
(45) Date of Patent: Jan. 10, 2023

(54) METHOD AND DEVICE FOR MAPPING AN INLET

(71) Applicant: Axel Spering, Aachen (DE)

(72) Inventor: Axel Spering, Aachen (DE)

( * ) Notice: Subject to any disclaimer, the term of this patent is extended or adjusted under 35 U.S.C. 154(b) by 383 days.

(21) Appl. No.: 16/794,682

(22) Filed: Feb. 19, 2020

(65) Prior Publication Data

US 2020/0263826 A1   Aug. 20, 2020

(30) Foreign Application Priority Data

Feb. 20, 2019   (DE) .......................... 102019104284.4

(51) Int. Cl.
*F16L 55/40* (2006.01)
*F16L 55/46* (2006.01)
*F16L 55/28* (2006.01)
*F16L 55/48* (2006.01)
*F16L 101/30* (2006.01)

(52) U.S. Cl.
CPC ............... *F16L 55/40* (2013.01); *F16L 55/46* (2013.01); *F16L 2101/30* (2013.01)

(58) Field of Classification Search
CPC ....... F16L 55/40; F16L 55/46; F16L 2101/30; F16L 55/28; F16L 55/48
See application file for complete search history.

(56) References Cited

U.S. PATENT DOCUMENTS

| 9,927,368 | B1* | 3/2018 | Olsson | ............... | G01N 21/8803 |
| 2014/0142844 | A1* | 5/2014 | Spering | ................ | G01C 21/32 |
| | | | | | 701/454 |

FOREIGN PATENT DOCUMENTS

| CN | 105090679 A | * | 11/2015 | .............. | F16L 55/34 |
| DE | 102010044465 A1 | | 3/2012 | | |
| DE | 102012207415 A1 | | 11/2013 | | |
| DE | 202013007512 U1 | * | 11/2013 | ................ | E03F 7/12 |
| DE | 202013007512 U1 | | 11/2013 | | |
| WO | WO-9305334 A1 | * | 3/1993 | .......... | F16L 55/1645 |

* cited by examiner

*Primary Examiner* — Herbert K Roberts
*Assistant Examiner* — Anthony W Megna Fuentes
(74) *Attorney, Agent, or Firm* — Von Rohrscheidt Patents

(57) ABSTRACT

A device for mapping an inlet into a tubular pipe, the device including a pipe robot including a base unit including a chassis configured for driving in the tubular pipe, a pivot arm arranged at the base unit, an indicator arranged at the pivot arm, a camera arranged at the pivot arm with a viewing direction towards the indicator, a control device; and a conductor arranged between the control device and the base unit and configured to transmit control signals of the control unit for positioning the base unit in the pipe, for pivoting the pivot arm about a longitudinal axis of the base unit and for pivoting the indicator relative to the inlet and to transmit an original image of the indicator that is captured by the camera to the control device. The invention also relates to a method for using the device.

8 Claims, 2 Drawing Sheets

METHOD AND DEVICE FOR MAPPING AN INLET

RELATED APPLICATIONS

This application claims priority from and incorporates by reference German patent application DE 10 2019 104 284.4 filed on Feb. 20, 2019 which is incorporated in their entirely by this reference.

FIELD OF THE INVENTION

The invention relates to a method or device for mapping an inlet into a tubular pipe.

BACKGROUND OF THE INVENTION

DE10 2010 044 465 A1 proposes to determine an orientation of a base unit relative to earth gravity in a device and in a method of the generic type recited supra using an inclination sensor in order to prevent a misalignment of the pipe robot in the pipe when reacquiring a mapped inlet after the pipe has been repaired with a liner.

DE 10 2012 207 485 A1 and other well-known generic devices include a position sensor that is fixed at the base unit and that detects an angle of the base unit relative to earth gravity. DE 20 2013 007 512 U1 proposes to fix and integrate a position sensor of this generic type in a bell shaped housing that is attached at the base unit, wherein a camera is pivotably arranged at the bell shaped housing.

BRIEF SUMMARY OF THE INVENTION

Thus it is an object of the invention to simplify reacquiring an inlet after a pipe has been repaired with a liner.

Improving upon the known device it is proposed according to the invention that the camera includes a position sensor for capturing an original angle between earth gravity and a viewing direction. The original angle is a position feature of an inlet in the pipe that can be checked in a simple and intuitive manner.

The object is achieved by A device for mapping an inlet into a tubular pipe, the device including a pipe robot including a base unit including a chassis configured for driving in the tubular pipe, a pivot arm arranged at the base unit, an indicator arranged at the pivot arm, a camera arranged at the pivot arm with a viewing direction towards the indicator, a control device; and a conductor arranged between the control device and the base unit and configured to transmit control signals of the control unit for positioning the base unit in the pipe, for pivoting the pivot arm about a longitudinal axis of the base unit and for pivoting the indicator relative to the inlet and configured to transmit an original image of the indicator that is captured by the camera to the control device, wherein the camera includes a position sensor configured to detect an original angle between earth gravity and the viewing direction.

The object is also achieved by a method for mapping an inlet into a tubular pipe, the method including positioning a base unit of a drivable pipe robot in the tubular pipe; pivoting a pivot arm arranged at the base unit about a longitudinal axis of the base unit so that an indicator arranged at the pivot arm indicates the inlet; capturing an original image of the indicator with a camera with a viewing direction towards the indicator wherein the camera is arranged at the pivot arm; transmitting the original image from the camera to a control device of the drivable pipe robot; capturing an original angle between earth gravity and the viewing direction with a position sensor; and transmitting the original angle from the position sensor to the control device, wherein the original angle is stored in the control device.

The object is also achieved by a method for opening an inlet in a tubular pipe repaired with a liner, the method including initially mapping the inlet according to the method according to the method recited supra; positioning a base unit of a drivable pipe robot in the pipe; pivoting a pivot arm arranged at the base unit about a longitudinal axis of the base unit so that a milling head arranged at the pivot arm opens the liner at the inlet; capturing an image of the milling head with a camera with a viewing direction towards the milling head wherein the camera is arranged at the pivot arm; transmitting the image from the camera to a control device of the drivable pipe robot; detecting an angle between earth gravity and the viewing direction with the position sensor; transmitting the angle from the position sensor to the control device; and determining a deviation of the angle from the original angle by the control device.

In particular acceleration sensors also designated as G sensors are useable as position sensors and determine angles of gravity that impacts a test mass relative to coordinate axes in a coordinate system that is proprietary to the sensor and which determine a position of the coordinate system relative to earth gravity.

Advantageously a vertical axis of the coordinate system of the sensor is oriented parallel to earth gravity in the device according to the invention in a driving position of the pivot arm on flat ground after the position sensor is calibrated, a longitudinal axis of the coordinate system is parallel to a longitudinal axis of the base unit and a transversal axis of the coordinate system is transversal to the longitudinal axis of the base unit. An angle of earth gravity relative to a plane that is defined by the longitudinal axis and the vertical axis of the sensor coordinate system corresponds to a an angle of a viewing direction of the camera relative to earth gravity in a projection onto a plane that extends transversal to a pipe axis.

Advantageously the camera is pivotably arranged at the pivot arm in a device according to the invention. The viewing direction of the camera can then be oriented towards different indicators or towards indicators that are pivoted in a different direction at the pivot arm.

Advantageously the position sensor of a device according to the invention includes a rate of turn sensor. Acceleration sensors facilitate a precise determination of an angular orientation when earth gravity is at an angle of π/4 relative all coordinate axes of the sensor coordinate system. This precision decreases with smaller angles. Since a rotation of the sensor about the direction of gravity does not cause any change of the measured forces no angle change is detected. When one of the coordinate axes is parallel to earth gravity then a rotation of the sensor about this coordinate axes does not cause any change of the measurement values. A supplemental turn rate sensor or gyro sensor in the position sensor can measure any relative angle change starting from a starting position, e.g. a defined driving position of the pivot arm and can correct measurement errors of the acceleration sensor that are inherent to the measurement principle.

Turn rate sensors and motion independent G sensors are also respectively designated as inertial sensors or inertia sensors and combination of the two sensors are designated as an inertial measuring unit.

Advantageously a device according to the invention includes a distance sensor that is arranged at the camera and oriented in the viewing direction. The distance sensor facilitates a precise determination of a distance of the camera from the indicator. This distance is another feature of a position of an inlet in the pipe that can be checked intuitively. The distance sensor of the device according to the invention can be in particular in infrared laser sensor. Infrared laser sensors facilitate a distance measuring that is unimpaired by visible external light. Additionally the camera can include a marking laser e.g. with red light which visibly marks a point on the indicator that is measured by the distance sensor parallel to the distance sensor.

Advantageously the indicator in a device according to the invention is a milling head. In this case the device can be used for opening a liner at the inlet without reconfiguration after mapping the inlet and repairing the pipe with the liner.

Improving upon the known method it is proposed according to the invention that a position sensor that is arranged at the camera captures an original angle between earth gravity and a viewing direction and transmits the original angle to the control device. The method according to the invention can be performed by a device according to the invention and is characterized by the advantages recited supra.

In a method according to the invention a position of the pipe robot that is associated with the inlet is stored in the control device in order to facilitate a positioning of the pipe robot after the pipe has been repaired with the liner in order to open the liner at the inlet at the same position.

Advantageously the original angle is stored in the control device in a method according to the invention. According to the method according to the invention the original angle can be called up again in order to open the liner at the inlet after the pipe has been repaired with the liner.

In a method according to the invention the components of the original angle can be stored separately in a plane that is oriented transversal to the pipe axis and in a plane that includes the pipe axis. Alternatively or additionally the original image can be stored in the control device. The original image includes the same position information of the mapped inlet like the numerical value of the component of the original angle in the plane that includes the pipe axis in a form that can be optically checked intuitively.

Advantageously the original angle is transmitted to the control device at an edge of the original image in a method according to the invention. This technique is well known under the designation "videodat". Alternatively the data of the original angle is transmitted in the scanning gap of the video signal. This technique is used for transmitting teletext, the VPS signal and a digital program guide (EPG) using the analog television signal.

Advantageously the original image is depicted rotated by the original angle in the control device in a method according to the invention so that earth gravity runs vertically in the representation of the original image. This representation in correct position facilitates intuitive capture of conditions in the pipe.

Improving upon DE 10 2010 044 465 A1, a method is proposed according to the invention for opening an inlet in a tubular pipe that has been repaired with a liner, wherein a base unit of a self-propelled pipe robot is positioned in the pipe and a pivot arm at the base unit is pivoted about a longitudinal axis of the base unit so that a milling head at the pivot arm opens the liner at the inlet wherein a camera that is oriented with a viewing direction towards the milling head and attached at the pivot arm captures an image of the milling head and transmits the image to a control device for the pipe robot, wherein the inlet is mapped according to one of the preceding methods according to the invention, wherein the position sensor captures an angle between earth gravity and the viewing direction and transmits the angle to the control device and the control device determines a deviation of the angle from the original angle.

The camera including the position sensor integrated according to the invention is particularly suitable for retrofitting older pipe robots for performing a method according to the invention.

BRIEF DESCRIPTION OF THE DRAWINGS

The invention is subsequently described based on an embodiment with reference to drawing figures, wherein.

DETAILED DESCRIPTION OF THE INVENTION

Figure 1:
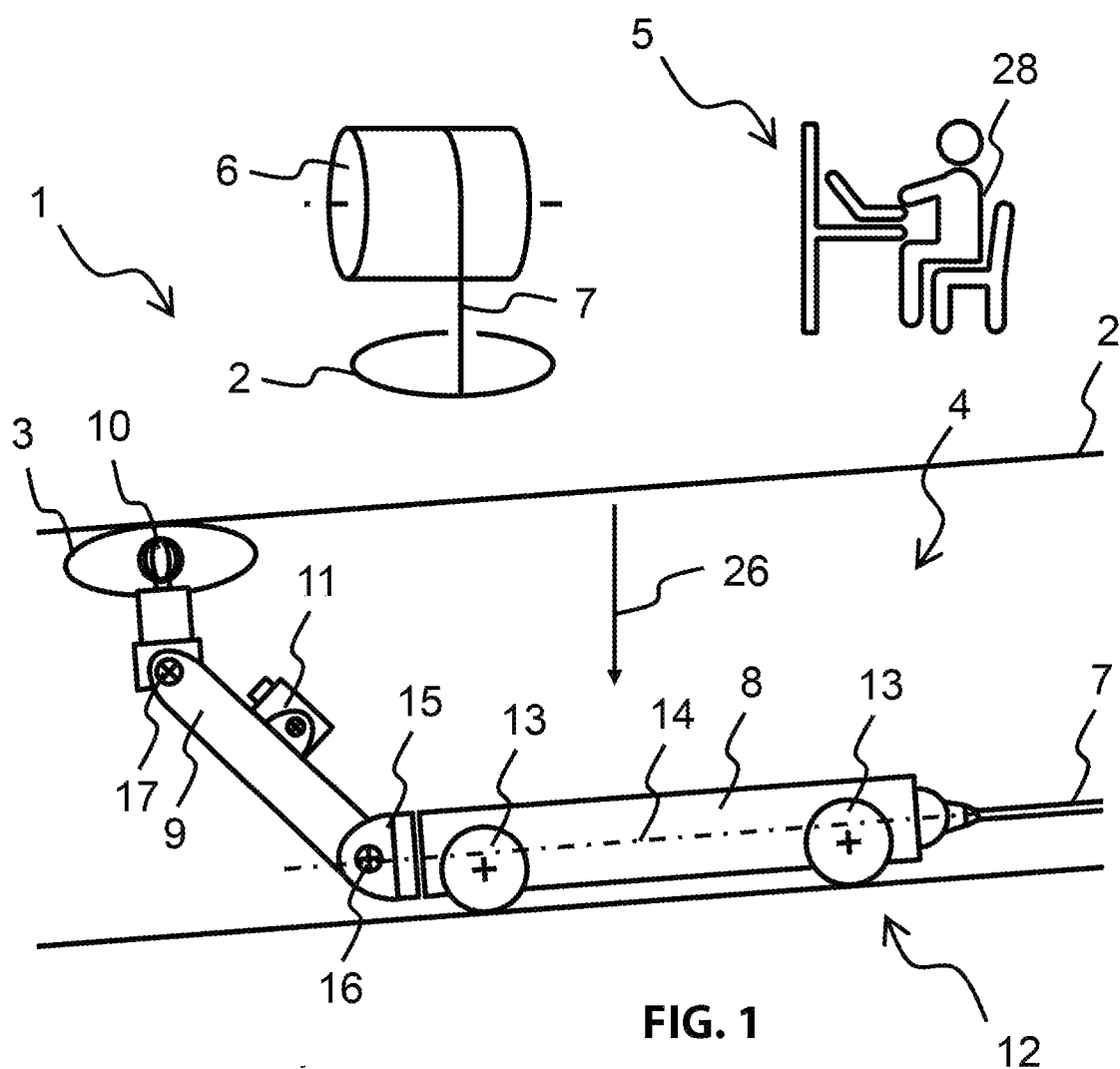
FIG. 1 illustrates a device according to the invention.
Figure 2:
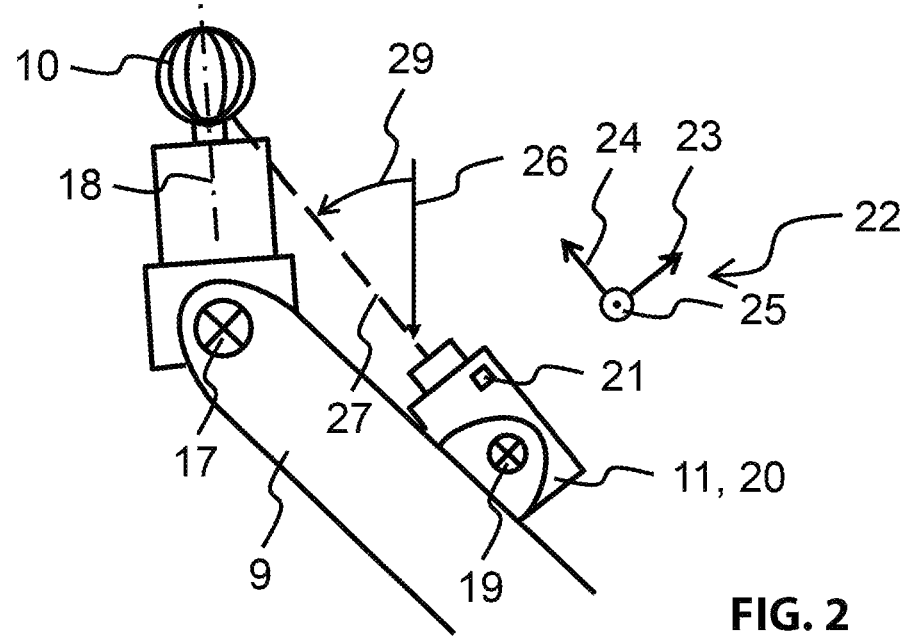
FIG. 2 illustrates a detail of the device according to the invention.
Figure 3:
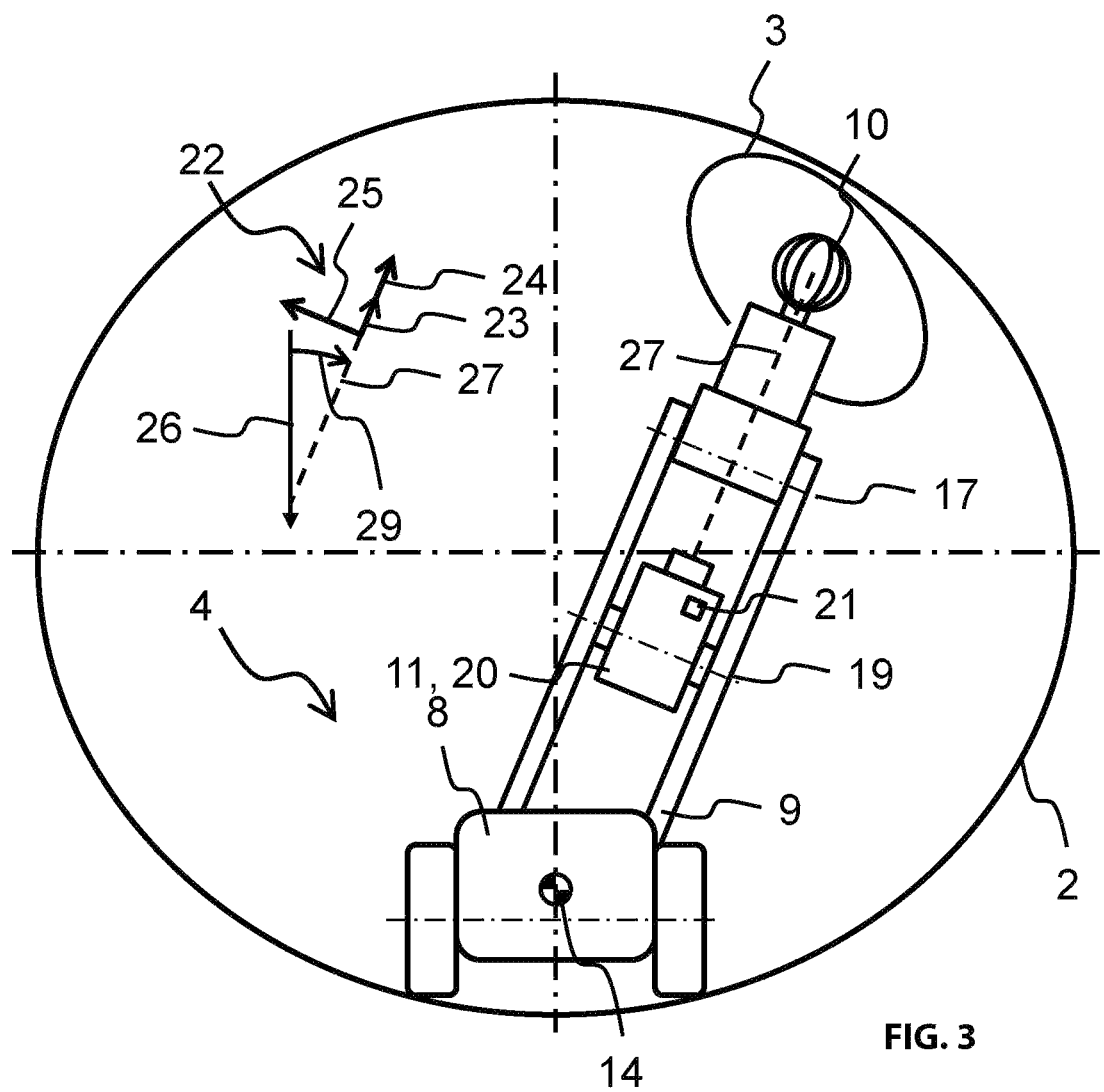
FIG. 3 illustrates the pipe robot of the device according to the invention.

FIG. 1 illustrates a device 1 according to the invention including a pipe robot 4 that is positioned in a slightly downward sloping pipe 2 at an inlet 3, a control device 5 and a conductor 7 between the control device 5 and the pipe robot 4 wherein the conductor is wound onto a drum 6. The pipe robot 4 includes a base unit 8, a pivot arm 9, a milling head that is used as an indicator 10 and a camera 11. The base unit 8 includes a chassis 12 with four individually driven wheels 13.

The pivot arm 9 is pivotably arranged at a pivot head 15 and pivotable about a pivot axis 16 that extends transversal to a longitudinal axis 14 of the base unit 8 wherein the pivot head 15 is attached at the base unit 8 and rotatable about the longitudinal axis 14 of the base unit 8. The milling head 10 is rotatable at the pivot arm 9 about a second pivot axis 17 that is parallel to the pivot axis 16 and rotatable about a tool axis 18 of the milling head 10. The camera 11 is pivotable at the pivot arm 9 about a third pivot axis 19 that also extends parallel to the pivot axis 16.

A position sensor 21 is arranged in a camera housing 20 of the camera 11. The position sensor 21 combines an acceleration sensor and a turn rate sensor in a highly integrated micro electro mechanical component (MEMS). The sensor proprietary coordinate system 22 of the position sensor 21 includes a vertical axis 23, a longitudinal axis 24 and a transversal axis 25. The position sensor 21 is calibrated so that the vertical axis 23 is parallel to earth gravity 26 in a non-illustrated driving position of the pivot arm 9 and the camera 11 on a flat surface and the longitudinal axis 24 of the position sensor 21 is oriented in a viewing direction 27 of the camera 11.

The positioning of the base unit 8 in the pipe 2 by means of the chassis 12, the rotation of the pivot head 15 about the longitudinal axis 14, the pivoting of the pivot arm 9 about the first pivot axis 16, the pivoting of the milling head 10 about the second pivot axis 17 and the pivoting of the camera 11 about the third pivot axis 19 and the rotation of the milling head 10 about the tool axis 18 are controllable by the control device 5 from an outside of the pipe 2.

The conductor 7 transmits the propulsion energy for the chassis 12, for pivoting the pivot arm 9 and the camera 11 and for pivoting and rotating the milling head 10, operating energy for the camera 11 and the control signals from the control device 5 to the pipe robot 4 and the image captured by the camera 11 and position information of the position sensor 21 to the control device 5.

In order to repair the pipe 2 the pipe robot 4 maps the inlet 3 in a first run. Thus, an operator 28 of the device 1 drives the pipe robot 4 in a driving position into the pipe 2 by means of the control device 5 and optically supported by a representation of an image captured by the camera 11, positions the pipe robot 4 at the inlet 3, pivots the milling head 10 towards to the inlet 3 and saves the position of the pipe robot 4, the captured original image of the inlet 3 with the milling head 10 positioned at the inlet 3 and the position information of the position sensor 21 in the control device 5.

The position sensor 21 is calibrated with a driving position of the pivot arm 9 before pivoting, of the milling head 10 and of the camera 11 as a start value and corrects the position information using values measured by the gyro sensor.

In a next step a liner is pulled into the pipe 2. In order to find the inlet 3 again the operator 28 positions the pipe robot 4 at the stored position by means of the control device 5, pivots the pivot arm 9 so that the position sensor 21 measures the stored position information again and positions the milling head 10 so that the image captured by the camera 11 coincides with the stored original image. The stored original image and the image captured by the camera 11 are represented in the control device 5 rotated so that earth gravity 26 runs vertical.

Figure 4:
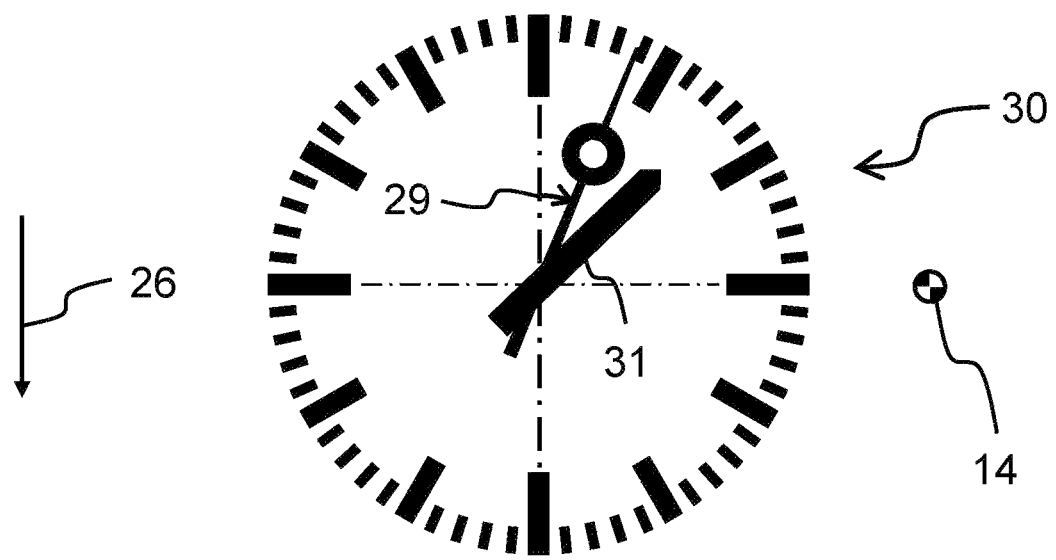
FIG. 4 illustrates a schematic representation of a position of an inlet.

A projection of the original angle 29 between the viewing direction 27 and the earth gravity 26 onto a surface that is oriented transversal to the longitudinal axis 14 of the base unit 8 is computed from the stored position information by coordinate transformation and is marked on a dial 30 as illustrated in FIG. 4. The indicator 31 of the dial 30 indicates the position information currently measured by the position sensor 21. The operator 28 positions the milling head 10 so that the indicator 31 points towards the position designated as original angle 29.

In this position the operator starts a rotation of the milling head 10 about the tool axis and thus opens the liner at the inlet 3.

REFERENCE NUMERALS AND DESIGNATIONS 1 device
2 pipe
3 inlet
4 pipe robot
5 control device
6 drum
7 conductor
8 base unit
9 pivot arm
10 indicator/milling head
11 camera
12 chassis
13 wheel
14 longitudinal axis
15 pivot head
16 pivot axis
17 pivot axis
18 tool axis
19 pivot axis
20 camera housing
21 position sensor
22 coordinate system
23 vertical axis
24 longitudinal axis
25 transversal axis
26 earth gravity
27 viewing direction
28 operator
29 original angle
30 dial
31 indicator

What is claimed is:

1. A device for mapping an inlet into a tubular pipe, the device comprising:
    a pipe robot including
    a base unit including a chassis configured for driving in the tubular pipe,
    a pivot arm arranged at the base unit,
    an indicator arranged at the pivot arm,
    a camera arranged at the pivot arm and pivotable thereto with a viewing direction towards the indicator so that the indicator is viewed by the camera,
    a control device; and
    a conductor arranged between the control device and the base unit and configured to transmit control signals of the control unit for positioning the base unit in the pipe, for pivoting the pivot arm about a longitudinal axis of the base unit and for pivoting the indicator relative to the inlet and configured to transmit an original image of the indicator that is captured by the camera to the control device,
    wherein the camera includes a position sensor fixed to the camera so that a longitudinal axis of the position sensor always coincides with the viewing direction and configured to detect an original angle between earth gravity and the viewing direction.

2. The device according to claim 1, wherein the position sensor includes a rate of turn sensor.

3. The device according to claim 1, wherein the indicator is a milling head.

4. A method for mapping an inlet into a tubular pipe, the method comprising:
    positioning a base unit of a drivable pipe robot in the tubular pipe;
    pivoting a pivot arranged at the base unit about a longitudinal axis of the base unit so that an indicator arranged at the pivot arm indicates the inlet;
    capturing an original image of the indicator with a camera with a viewing direction towards the indicator wherein the camera is arranged at the pivot arm;
    transmitting the original image from the camera to a control device of the drivable pipe robot;
    capturing an original angle between earth gravity and the viewing direction with a position sensor fixed to the camera, wherein a longitudinal axis of the position sensor always coincides with the viewing direction during a movement of the camera; and
    transmitting the original angle from the position sensor to the control device.

5. The method according to claim 4, further comprising: storing the original angle in the control device.

6. A method for opening an inlet into a tubular pipe repaired with a liner, the method comprising:
    initially mapping the inlet according to the method according to claim 5;
    positioning the base unit of the drivable pipe robot in the pipe;

pivoting the pivot arm arranged at the base unit about a longitudinal axis of the base unit so that a milling head arranged at the pivot arm opens the liner at the inlet;

capturing an image of the milling head with the camera with the viewing direction towards the milling head wherein the camera is arranged at the pivot arm;

transmitting the image from the camera to the control device of the drivable pipe robot;

detecting an angle between earth gravity and the viewing direction with the position sensor;

transmitting the angle from the position sensor to the control device; and determining a deviation of the angle from the original angle by the control device.

7. The method according to claim 4, further comprising, transmitting the original angle to the control device at an edge of the original image.

8. The method according to claim 4, further comprising: rotating the original image in the control device about the original angle so that the earth gravity is oriented vertical in a representation of the original image.

\* \* \* \* \*